(12) United States Patent
Singh et al.

(10) Patent No.: US 11,604,657 B2
(45) Date of Patent: Mar. 14, 2023

(54) CONTAINERIZED POINT-OF-SALE (POS) SYSTEM AND TECHNIQUE FOR OPERATING

(71) Applicant: NCR Corporation, Atlanta, GA (US)

(72) Inventors: Narinder Singh, Lawrenceville, GA (US); Kiran Kumar Chintamani Muniveerappa Reddy, Hyderabad (IN)

(73) Assignee: NCR Corporation, Atlanta, GA (US)

( * ) Notice: Subject to any disclaimer, the term of this patent is extended or adjusted under 35 U.S.C. 154(b) by 60 days.

(21) Appl. No.: 17/245,237

(22) Filed: Apr. 30, 2021

(65) Prior Publication Data
US 2022/0350616 A1 Nov. 3, 2022

(51) Int. Cl.
*G06F 9/4401* (2018.01)
*G06Q 20/20* (2012.01)
*G06F 9/54* (2006.01)

(52) U.S. Cl.
CPC .......... *G06F 9/4411* (2013.01); *G06F 9/4406* (2013.01); *G06F 9/546* (2013.01); *G06Q 20/202* (2013.01)

(58) Field of Classification Search
CPC ...... G06F 9/4411; G06F 9/4406; G06F 9/546; G06Q 20/202
USPC .......................................................... 713/2
See application file for complete search history.

(56) References Cited

U.S. PATENT DOCUMENTS

| | | | | |
|---|---|---|---|---|
| 6,421,079 B1* | 7/2002 | True | .................. | H04N 1/00249 348/E3.003 |
| 6,615,303 B1* | 9/2003 | Endo | ..................... | G06F 9/4843 342/357.31 |
| 6,985,951 B2* | 1/2006 | Kubala | .................. | G06F 9/5083 718/104 |
| 2002/0129172 A1* | 9/2002 | Baskey | ................... | G06F 9/544 719/321 |
| 2003/0018796 A1* | 1/2003 | Chou | ...................... | H04W 4/18 709/231 |
| 2006/0005186 A1* | 1/2006 | Neil | ....................... | G06F 9/4555 718/1 |
| 2006/0031607 A1* | 2/2006 | Berreth | ................... | G06F 9/544 710/52 |
| 2009/0061838 A1* | 3/2009 | Lin | .......................... | G06F 9/54 455/418 |
| 2009/0113458 A1* | 4/2009 | Finger | ................. | G06F 9/45533 719/327 |
| 2010/0146033 A1* | 6/2010 | Kaczynski | ............. | G06Q 10/04 709/201 |

(Continued)

*Primary Examiner* — Paul R. Myers
(74) *Attorney, Agent, or Firm* — Schwegman, Lundberg & Woessner

(57) ABSTRACT

A Point-Of-Sale (POS) processing environment is encapsulated within a container running on a first Operating System (OS) of a transaction terminal. Peripheral drivers for connected peripherals run on a second and different OS of the transaction terminal. A platform processing environment runs the peripheral drivers on the second and different OS of the terminal. A socket interface is provided for communication between transaction applications of the POS processing environment with the peripheral drivers of the platform processing environment for purposes of allowing the transaction applications to control and access the connected peripherals during transactions performed at the transaction terminal via the socket interface.

20 Claims, 3 Drawing Sheets

(56) References Cited

U.S. PATENT DOCUMENTS

| | | | |
|---|---|---|---|
| 2010/0169599 A1* | 7/2010 | Natu | G06F 12/1433 |
| | | | 713/193 |
| 2012/0042314 A1* | 2/2012 | Aydin | G06F 16/2453 |
| | | | 718/101 |
| 2012/0084798 A1* | 4/2012 | Reeves | H04L 67/131 |
| | | | 719/319 |
| 2012/0086716 A1* | 4/2012 | Reeves | G06F 3/1431 |
| | | | 345/522 |
| 2012/0113992 A1* | 5/2012 | Zhao | H04L 69/22 |
| | | | 370/431 |
| 2012/0124559 A1* | 5/2012 | Kondur | G06F 8/41 |
| | | | 717/125 |
| 2015/0324180 A1* | 11/2015 | Tredoux | G06F 8/61 |
| | | | 719/321 |
| 2019/0095359 A1* | 3/2019 | Kim | G06F 15/17331 |

\* cited by examiner

CONTAINERIZED POINT-OF-SALE (POS) SYSTEM AND TECHNIQUE FOR OPERATING

BACKGROUND

Retailers often rely on their own internally developed Point-Of-Sale (POS) software or rely on custom modifications made to third-party POS software. Each retailer has its own needs and reasons for customization.

Most peripheral devices (card readers, scanners, weigh scales, cash drawers, etc.) have been standardized to a common industry adopted communication interface, referred to as JAVAPOS®. This interface allows the terminal-based POS applications to access and interface with connected peripherals as control objects. The control objects access and interface with service objects, which are associated with the hardware drivers and features of the peripherals. Each peripheral vendor provides its own set of service objects for their peripherals. The terminal-based POS applications merely interact through control objects and the control objects manage the interface to the corresponding service objects.

The control/service objects provided by the peripheral vendors for the peripherals are not supported for some Operating Systems (OSs), such as Android®. This means that the retailers are forced to maintain and develop their POS software on OSs supported by the control/service objects of their needed peripheral devices. Even a large retailer will have a difficult time convincing many different peripheral vendors to support their desired OSs because OSs are regularly patched and updated, which means the support is not merely a simple port to new OS control/service objects but it is an ongoing task requiring developers and support staff to adequately maintain.

Yet, every retailer has its own business needs and reasons for their preferred OS, and it is unreasonable to force retailers to specific OSs and/or to specific hardware architectures in order to use desired peripheral devices with their POS systems.

SUMMARY

In various embodiments, containerized POS system and techniques for operating are presented.

According to an embodiment, a method for operating a POS application within a containerized OS for control of and access to peripherals associated with a disparate OS from the containerized OS is presented. An intra-device socket connection is established between a first processing platform of a terminal and a second processing platform of the terminal. The first processing platform comprises a first Operating System (OS) and the second processing platform comprises a second OS. Device drivers for peripherals are controlled by the second processing platform. Peripheral communications originating from the first processing platform are processed through the intra-device socket connection for processing by the second processing platform with the device drivers.

DETAILED DESCRIPTION

Figure 1:
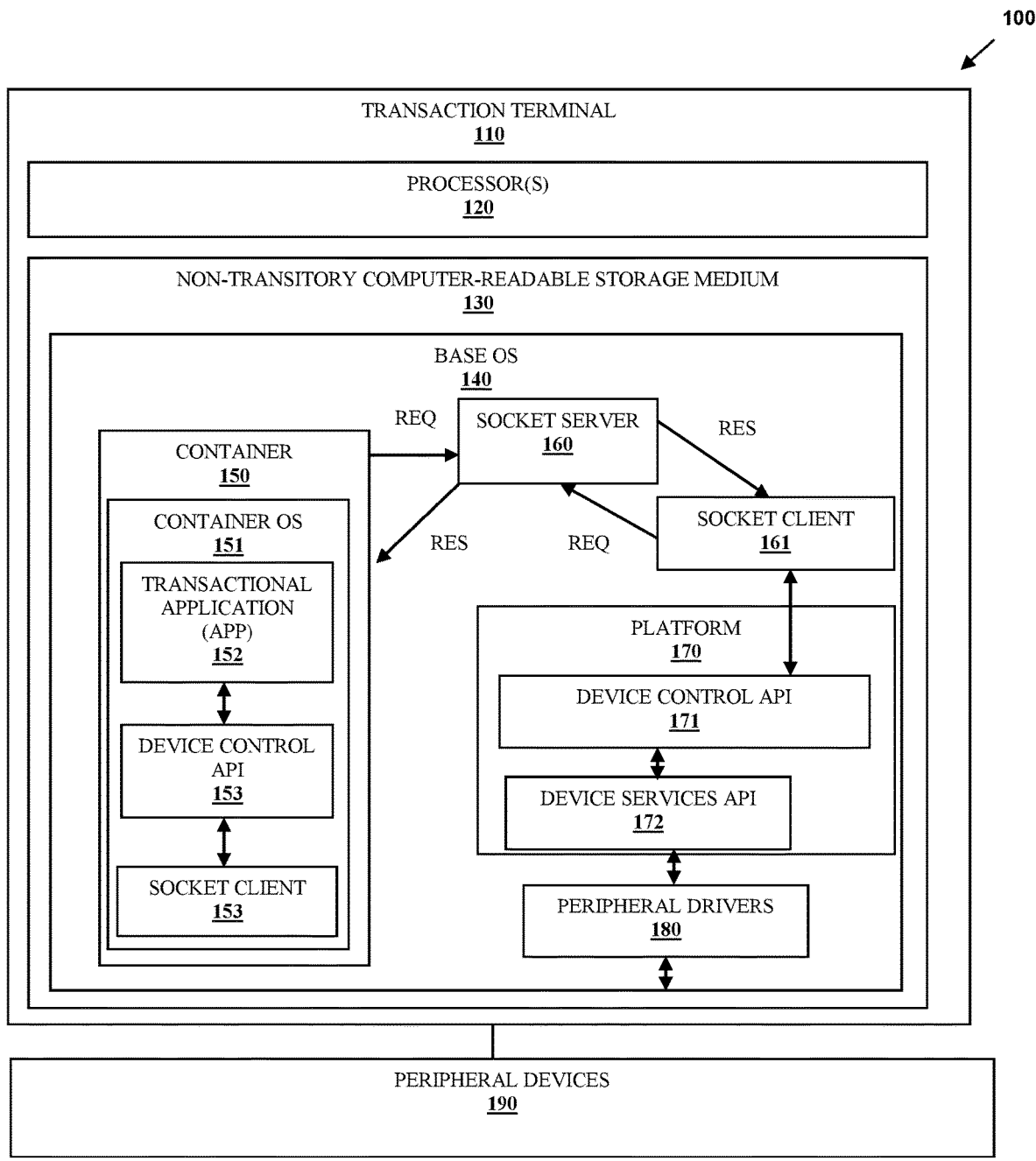
FIG. 1 is a diagram of a system for a containerized POS system, according to an example embodiment.

FIG. 1 is a diagram of a system 100 for a containerized POS system along with a method of operating system 100 according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or fewer components are possible without departing from the teachings of operating a POS application within a containerized OS for control of and access to peripherals associated with a disparate OS from the containerized OS, presented herein and below.

As will be demonstrated herein, system 100 provides a host machine architecture by which a host application is containerized in its own processing environment and runs within its own container OS on top of a base OS of the host machine. An interface is provided within the container OS that permits the host application to discover, control, and communicate with peripherals connected to the host machine via its base OS. The interface is a socket-based interface utilizing a socket server and two socket clients. A first socket client resides within the container OS and the second socket client acts as an intermediary and frontend to a platform processing environment associated with the base OS and associated with interacting with peripheral drivers of the peripherals.

The architecture of system 100 is hardware independent and does not require any specialized hardware and is capable of being implemented on any hardware. Moreover, existing hardware can be enhanced to include and operate system 100. Existing peripheral drivers do not require any modifications and do not require any modifications to their source codes for operating system 100. Service tools to isolate hardware problems remain unchanged and can be used with system 100 as do existing software update tools for the containerized OS and the base OS.

As used herein the term "host" or the phrase "host machine" refers to the hardware machine upon which the architecture of system 100 is implemented. A host can be any computing device. A "transaction terminal" or "terminal" is one type of host machine and refers to a Self-Service Terminal (SST), a Point-Of-Sale (POS) terminal, a kiosk, a tablet, a phone, or a wearable processing device; the transaction terminal performs transactions on behalf of customers/consumers that are checking out after purchasing one or more items from a retailer or enterprise.

The host 110 is connected or interfaced to one or more peripheral devices 190 (hereinafter just "peripherals 190"). Some example peripherals 190 include: a contact-based card reader, a contactless card reader, a printer, a currency/coin dispenser/accepter, a Personal Identification Number (PIN) keypads (PINpad), a scanner, a weight scale, a combined scanner and weigh scale, a cash drawer, a checkout lane or station pole status light, a camera, a touch display, a keyboard, barcode readers, a speaker, a microphone, a Bluetooth® transceiver, a Wi-Fi transceiver, a Near Field Communication (NFC) transceiver, etc. The peripheral is connected or interfaced to the host via a wired connection of or via a wireless connection.

System 100 comprises a transaction terminal 110 (one type of host as discussed above). Transaction terminal 110 comprises at least one processor 120 and a non-transitory computer-readable storage medium 130. Medium 130 comprises executable instructions for a base OS 140, a container processing environment 150, a socket server 160, a socket client 161, a platform processing environment 170, and peripheral device drivers 180 (herein after just "drivers 180").

Container processing environment 150 (herein after just "container 150") is a logically organized data structure that defines a processing context. Container 150 comprises a container OS 151, a transaction application (app) 152, a device control Application Programming Interface (API), and a socket client 153.

Platform processing environment 170 (herein after just "platform 170") is a logically organized data structure that defines a second and different processing context from that which was associated with container 150. Platform 170 comprises a device control API 171 and a device services API 172.

As stated above, terminal 110 is connected or interfaced to a plurality and variety (different types) of peripherals 190.

Container OS 151 is different from base OS 140 and is defined and runs on top of base OS 140 as its own independent processing environment. In an embodiment, container 150 is an enhanced open source Docker® container having its own bundled software, libraries, settings, and configuration files. Container 150 is lightweight and stand-alone set of executable instructions that includes everything needed to run transaction application 152 including its own OS 151

Container 150 is customized for container OS 151.

Device control API 153 is a set of API calls that presents to transaction app 152 as control objects for issuing commands and interacting with peripherals 190. In an embodiment, device control API 152 is a JAVAPOS® control object API.

Socket client 153 issues any API call from device control API 153 originating from transaction app 152 to socket server 160 as a request (REQ in FIG. 1). Socket Server 160 detects the request and forwards to socket client 161. Device control API 171 receives the request as a response within platform 170 and translates the API call into a corresponding service API call with device services API 172. Device services API 172 translates the API call into low-level driver instructions recognized by a driver 180. Driver 180 processes the low-level driver instructions to control a peripheral 190.

Data or messages returned from a peripheral 190 is captured and by the corresponding driver 180 and provided to the device services API 172. Device services API 172 translates into messages provided to device control API 172. Device control API 172 translates into messages that are recognized by device control API 153 and sends as a request to socket client 161; socket client 161 sends through socket server 160 to socket client 153; socket client 153 provides to device control API 153; and device control API 153 provides to transaction app 152.

A socket client-server architecture is provided through which inter-process communication is established between container 150 and platform 170. Platform 170 directly interacts with drivers 180 from base OS 140 and acts as an intermediary or front end to drivers 180 for container 150. A socket connection between container 150 and platform 170 allows transaction app 152 to control, access, and receive data from peripheral devices 190 when it otherwise would be unable to do so, since container OS 151 is different from base OS 140 associated with platform 170. The socket comprises of a port identifier for a port and an Internet Protocol (IP) address. Even though container 150 resides on a same terminal 110 as platform 170, both container 150 and platform 170 are assigned IP addresses (via socket client 152 and socket client 161), which permits the sockets for the communication to be established via socket server 160 and socket clients 153 and 161. This allows intra-device communication between two logical devices (container 150 and platform 170) within a same physical device utilizing Transmission Control Protocol (TCP)/IP techniques via a novel intra-device socket interface. That is, the TCP/IP performs the necessary translations needed by container 150 and platform 170 based on their settings and configurations for clients 152 and 161.

In an embodiment, device control API 153, device control API 171, and device services API 172 implement a JAVAPOS® API.

In an embodiment, the container OS 151 is an Android® OS and base OS 140 is a Linux® OS.

In an embodiment, no source code modifications are needed to transaction app 152 or peripheral drivers 180 for integrated system 100 on terminal 110.

System 100 permits a retailer to maintain their transaction app 152 utilizing any desired OS 151 (such as Android®, which is geared towards smaller and portable devices) while maintaining connectivity and control of third-party provided peripherals 190 needed for operation of the retailer's terminal 110. All existing system tools are still available to the retailer through platform 170. This allows retailers to provide the desired features and functions they need for their transaction processing while at the same time being assured that they will not lose connectivity and access to the terminal's peripherals 190.

The above-noted embodiments and other embodiments are now discussed with reference to FIGS. 2-3.

Figure 2:
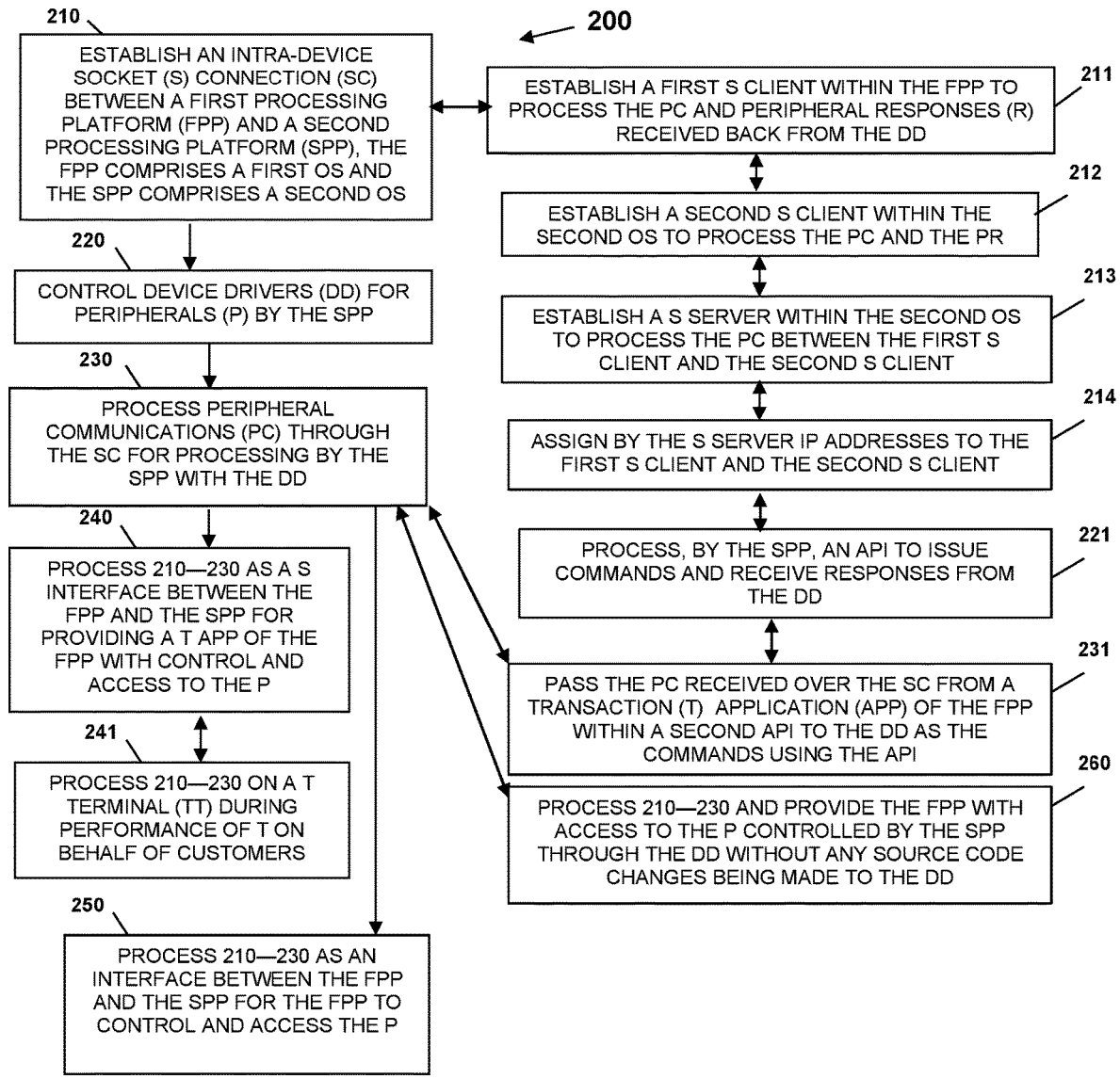
FIG. 2 is a diagram of a method for method for operating a POS application within a containerized OS for control of and access to peripherals associated with a disparate OS from the containerized OS, according to an example embodiment.

FIG. 2 is a diagram of a method 200 for operating a POS application within a containerized OS for control of and access to peripherals associated with a disparate OS from the containerized OS, according to an example embodiment. The software module(s) that implements the method 200 is referred to as a "cross OS peripheral integrator." The cross OS peripheral integrator is implemented as executable instructions programmed and residing within memory and/or a non-transitory computer-readable (processor-readable) storage medium and executed by one or more processors of a device. The processor(s) of the device(s) that executes the cross OS peripheral integrator are specifically configured and programmed to process the cross OS peripheral integrator. The cross OS peripheral integrator may have access to one or more network connections during its processing. The network connections can be wired, wireless, or a combination of wired and wireless.

In an embodiment, the cross OS peripheral integrator executes on terminal 110.

In an embodiment, terminal 110, is an SST, a POS terminal, a kiosk, an Automated Teller Machine ATM), a tablet, a phone, or a wearable processing device.

In an embodiment, the cross OS peripheral integrator is all or some combination of transaction app 152, device control API 153, socket client 153, socket server 160, socket client 161, device control API 171, and/or device services API 172.

At 210, cross OS peripheral integrator establishes an intra-device (within a single device) socket connection between a first processing platform and a second processing platform. The first processing platform comprises a first OS and the second processing platform comprises a second OS (the first OS is different type of OS from the second OS). In an embodiment, the first processing platform is container 150.

In an embodiment, at 211, the cross OS peripheral integrator establishes a first socket client within the first processing platform to process peripheral communications and peripheral responses received back from device drivers of connected peripherals to the device that executes the cross OS peripheral integrator.

In an embodiment of 211 and at 212, the cross OS peripheral integrator establishes a second socket client within the second OS to process the peripheral communications and the peripheral responses within the second OS.

In an embodiment of 212 and at 213, the cross OS peripheral integrator establishes a socket server within the second OS to process the peripheral communications between the first socket client and the second socket client.

In an embodiment of 213 and at 214, the socket server, assigns IP addresses to the first socket client and the second socket client.

At 220, the second processing platform, controls the device drivers for the connected peripherals within the second OS.

In an embodiment of 214 and 220, at 221, the second processing platform processes an API to issue commands and receive responses from the device drivers within the second OS.

At 230, the cross OS peripheral integrator processes the peripheral communications through the intra-device socket connection for processing by the second processing platform with the device drivers.

In an embodiment of 221 and 230, at 231, the cross OS peripheral integrator passes the peripheral communications received over the intra-device socket connection from a transaction application of the first processing platform within a second API to the device drivers as the commands using the API.

In an embodiment, at 240, the cross OS peripheral integrator is processes as a socket interface between the first processing platform and the second processing platform for providing a transaction application of the first processing platform with control and access to the peripherals when the peripherals could not otherwise be accessed from the first OS or were not otherwise compatible with the first OS of the first processing platform.

In an embodiment of 240 at 241, the cross OS peripheral integrator is processed or executed on a transaction terminal during performance of transaction be processed on behalf of customers performing checkouts at the transaction terminal.

In an embodiment, at 250, the cross OS peripheral integrator is processed as an interface between the first processing platform and the second processing platform for the first processing platform to control and access the peripheral, which the first processing platform is otherwise unable to do based on the differences between the first OS and the second OS (the peripherals only natively supported for access via the second OS and the first processing platform having the first OS).

In an embodiment, at 260, the cross OS peripheral integrator is processes and provides the first processing platform with access to the peripherals, which are controlled by the second processing platform through the device drivers and access to the first processing platform is provided without any source code changes being made or required to be made to the device drivers.

Figure 3:
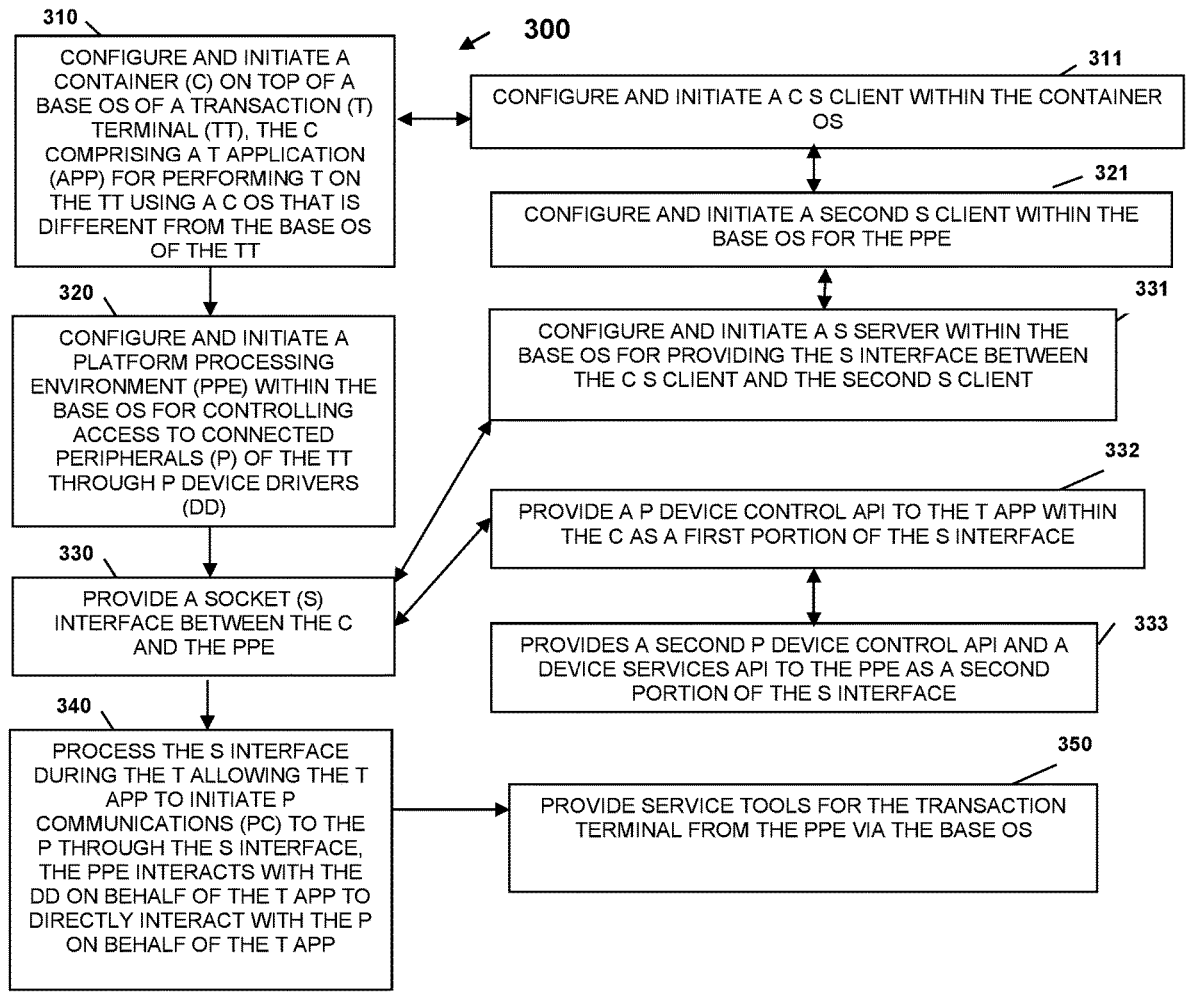
FIG. 3 is a diagram of another method for method for operating a POS application within a containerized OS for control of and access to peripherals associated with a disparate OS from the containerized OS, according to an example embodiment.

FIG. 3 is a diagram of another method 300 for operating a POS application within a containerized OS for control of and access to peripherals associated with a disparate OS from the containerized OS, according to an example embodiment. The software module(s) that implements the method 300 is referred to as a "peripheral control manager." The peripheral control manager is implemented as executable instructions programmed and residing within memory and/or a non-transitory computer-readable (processor-readable) storage medium and executed by one or more processors of a device. The processor(s) of the device that executes the peripheral control manager are specifically configured and programmed to process the peripheral control manager. The peripheral control manager may have access to one or more network connections during its processing. The network connections can be wired, wireless, or a combination of wired and wireless.

In an embodiment, the device that executes the peripheral control manager is transaction terminal 110. In an embodiment, transaction terminal 110 is a POS terminal, a SST, an ATM, a kiosk, a tablet, a phone, a wearable processing device.

In an embodiment, the peripheral control manager is all of, or some combination of, transaction app 152, device control API 153, socket client 153, socket server 160, socket client 161, device control API 171, device services API 172, and/or method 200.

The peripheral control manager presents another and, in some ways, an enhanced processed perspective from that which was shown in method 200.

At 310, the peripheral control manager configures and initiates a container on top of a base OS of a transaction terminal. The container comprises a transaction application for performing transactions on the transaction terminal using a container OS that is different from the base OS of the transaction terminal.

In an embodiment, at 311, the peripheral control manager configures and initiates a container socket client within the container OS.

At 320, the peripheral control manager configures and initiates a platform processing environment within the base OS for controlling access to connected peripherals of the transaction terminal through device drivers.

In an embodiment of 311 and 320, at 321, the peripheral control manager configures and initiates a second socket client within the base OS for the platform processing environment.

At 330, the peripheral control manager provides a socket interface between the container and the platform processing environment.

In an embodiment of 321 and 330, at 331, the peripheral control manager configures and initiates a socker server within the base OS for providing the socket interface between the container socket client and the second socket client.

In an embodiment, at 332, the peripheral control manager provides a peripheral device control API to the transaction application within the container as a first portion of the socket interface.

In an embodiment of 332 and at 333, the peripheral control manager provides a second peripheral device control API and a device services API to the platform processing environment as a second portion of the socket interface.

At 340, the peripheral control manager processes the socket interface during the transactions allowing the transaction application to initiate peripheral communications with the peripheral through the socket interface. The platform processing environment interacts with the device drivers on behalf of the transaction application to directly interact from the base OS with the peripherals on behalf of the transaction application.

In an embodiment, at 350, the peripheral control manager provides service tools for the transaction terminal from the platform processing environment via the base OS.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    establishing an intra-device socket connection between a first processing platform of a terminal and a second processing platform of the terminal, wherein the first processing platform comprises a first Operating System (OS) and the second processing platform comprises a second OS;
    controlling device drivers for peripherals by the second processing platform;
    processing peripheral communications originating from the first processing platform through the intra-device socket connection for processing by the second processing platform with the device drivers; and
    processing the method independent of any hardware associated with the terminal and without any modifications to source code associated with the device drivers of the peripherals.

2. The method of claim 1 wherein establishing further includes establishing a first socket client within the first processing platform to process the peripheral communications and peripheral responses received back from the device drivers.

3. The method of claim 2, wherein establishing further includes establishing a second socket client within the second OS to process the peripheral communications and the peripheral responses.

4. The method of claim 3, wherein establishing further includes establishing a socket server within the second OS to process the peripheral communications between the first socket client and the second socket client.

5. The method of claim 4, wherein establishing further includes assigning by the socket server Internet Protocol (IP) addresses to the first socket client and the second socket client.

6. The method of claim 5, wherein controlling further includes processing, by the second processing platform an Application Programming Interface (API) to issue commands and receive responses from the device drivers.

7. The method of claim 6, wherein processing further includes passing the peripheral communications received over the intra-device socket connection from a transaction application of the first processing platform within a second API to the device drivers as the commands using the API.

8. The method of claim 1 further comprising, processing the method as a socket interface between the first processing platform and the second processing platform for providing a transaction application of the first processing platform control and access to the peripherals.

9. The method of claim 8 further comprising, processing the method on a transaction terminal during performance of transactions.

10. The method of claim 1 further comprising, processing the method as an interface between the first processing platform and the second processing platform for the first processing platform to control and access the peripherals.

11. The method of claim 1 further comprising, processing the method and providing the first processing platform with access to the peripherals controlled by the second processing platform through the device drivers.

12. A method, comprising:
    configuring and initiating a container on top of a base Operating System (OS) of a transaction terminal, wherein the container comprising a transaction application for performing transactions on the transaction terminal using a container OS that is different from the base OS of the transaction terminal;
    configuring and initiating a platform processing environment within the base OS for controlling access to connected peripherals of the transaction terminal through peripheral device drivers;
    providing a socket interface between the container and the platform processing environment;
    processing the socket interface during the transactions allowing the transaction application to initiate peripheral communications to the peripherals through the socket interface, wherein the platform processing environment interacts with the peripheral device drivers on behalf of the transaction application to directly interact with the peripherals on behalf of the transaction application; and
    processing the method independent of any hardware associated with the transaction terminal and without any modifications to source code associated with the peripheral device drivers of the peripherals.

13. The method of claim 12, wherein configuring and initiating the container further includes configuring and initiating a container socket client within the container OS.

14. The method of claim 13, wherein configuring and initiating the platform processing environment further includes configuring and initiating a second socket client within the base OS for the platform processing environment.

15. The method of claim 14, wherein providing further includes configuring and initiating a socket server within the base OS for providing the socket interface between the container socket client and the second socket client.

16. The method of claim 12, wherein providing further includes providing a peripheral device control Application Programming Interface (API) to the transaction application within the container as a first portion of the socket interface.

17. The method of claim 16, wherein providing further includes providing a second peripheral device control API and a device services API to the platform processing environment as a second portion of the socket interface.

18. The method of claim 12 further comprising, providing service tools for the transaction terminal from the platform processing environment via the base OS.

19. A system, comprising:
a transaction terminal comprising at least one processor and a non-transitory computer-readable storage medium;
the non-transitory computer-readable storage medium comprising first executable instructions for a base Operating System (OS) comprising a socket client, a socket server, a platform processing environment, and device drivers for peripherals;
the non-transitory computer-readable storage medium further comprising second executable instructions for a container comprising a container OS with a transaction application and a second socket client;
the container when executed by the at least one processor from the non-transitory computer-readable storage medium cause the at least one terminal processor to perform operations comprising:
providing, by the transaction application, peripheral commands being directed to the peripherals to a device control Application Programming Interface (API) of the container;
providing, by the device control API, the peripheral commands to the second socket client;
providing, by the second socket client, the peripheral commands to the socket server for delivery to the socket client associated with the platform processing environment;
receiving, by the second socket client, peripheral responses from the socket server and generated by the peripherals and original provided by the device drivers in response to processing the peripheral commands;
providing, by the second socket client, the peripheral responses to the device control API; and
providing, by the device control API, the peripheral responses to the transaction application;
the platform processing environment, the socket server, the socket client, and the device drivers when executed by the at least one processor from the non-transitory computer-readable storage medium cause the at least one processor to perform second operations comprising:
receiving, by the socket client, the peripheral commands from the socket server;
providing, by the socket client, the peripheral commands to a second device control API;
providing, by the second device control API, the peripheral commands to a device services API;
translating, by the device services API, the peripheral commands into driver instructions;
providing, by the device services API, the driver instructions to the device drivers;
processing, by the device drivers, the driver instructions with the peripherals;
receiving back through the device drivers, the devices services API, and the second device control API the peripheral responses from the peripherals;
providing, by the second device control API, the peripheral responses to the socket client; and
providing, by the socket client, the peripheral responses to the socket server for delivery to the second socket client of the container;
wherein the container and the platform processing environment processed independent of any hardware associated with the transaction terminal and without any modifications to source code associated with the device drivers of the peripherals.

20. The system of claim 19, wherein the transaction terminal is an Automated Teller Machine (ATM), a Self-Service Terminal (SST), a Point-Of-Sale (POS) terminal, or a kiosk, and wherein the base OS is different from the container OS.

* * * * *